Feb. 25, 1930.  J. KOPELIOWITSCH ET AL  1,748,719
PROTECTION OF ELECTRICAL APPARATUS
Filed July 13, 1927
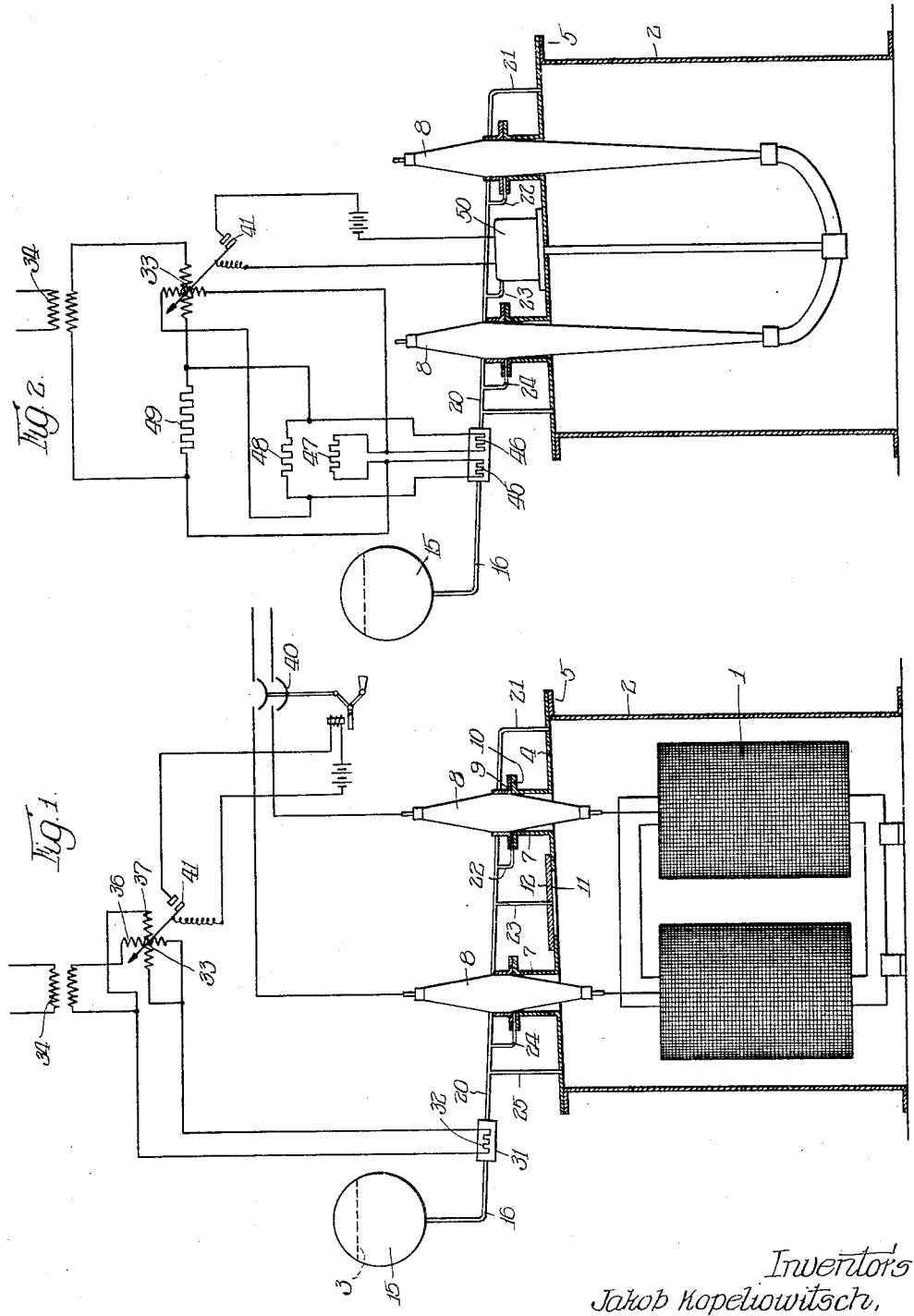
Inventors:
Jakob Kopeliowitsch,
Johannes Kübler,
By Cromwell, Greist Warden
attys
Witness:
R. Burkhardt Patented Feb. 25, 1930

1,748,719

UNITED STATES PATENT OFFICE

JAKOB KOPELIOWITSCH AND JOHANNES KÜBLER, OF BADEN, SWITZERLAND, ASSIGNORS TO A. G. BROWN BOVERI & CIE., OF BADEN, SWITZERLAND, A JOINT-STOCK COMPANY OF SWITZERLAND

PROTECTION OF ELECTRICAL APPARATUS

Application filed July 13, 1927, Serial No. 205,393, and in Germany July 16, 1926.

This invention relates to the protection of electrical apparatus, and it has particular relation to the protection of electrical apparatuses that are operating in an insulating or quenching liquid, such as oil.

Among the objects of the invention is the provision of an improved organization for collecting and detecting gases developed in oil-immersed transformers, circuit breakers and like apparatus by reason of an internal fault or trouble in such apparatus. Other objects of the invention involve the utilization of said gas-collecting and detecting means for automatically cutting off the protecting apparatus from the power line with which it is associated. The invention will be best understood from the accompanying drawings wherein Figs 1 and 2 are diagrammatic illustrations of two different forms of the invention.

The protective system of the present invention utilizes the fact that troubles or irregularities in transformers or circuit breakers which are operated under oil lead to the formation of gases within the oil. Thus, for instance, sparking by the adjacent windings of a transformer or an internal short-circuit or arc between portions of the apparatus that are of different potential, or excessive leakage of current will cause the oil or insulating liquid to decompose, thus generating gases. The present invention makes use of the gases so formed for detecting the faults in the apparatus that is to be protected and for preventing further trouble that may arise therefrom.

One feature of the invention resides in an improved arrangement for collecting the gases formed by reason of internal troubles in the apparatus. It has been found that in an arrangement of such character it is not sufficient to rely on the assumption that the gas bubbles ascending from the oil will always proceed to the highest point in the transformer or circuit-breaker tank where they may be detected. Very often the small gas bubbles that are gradually formed within the oil will be caught in projections, ridges or pockets beneath the transformer cover, the latter acting as traps for the bubbles and preventing the same from exercising their protective function.

According to the present invention, the gas-collecting device is arranged above the level of the transformer cover. Every point beneath the cover which might serve as a collecting place for the gas is connected to the gas-collecting device by means of a system of pipes arranged to positively prevent trapping of the gas bubbles on their way to the gas-collecting device. Such arrangement is shown in Figs. 1 and 2 of the drawings.

An electrical apparatus 1, such as a transformer or circuit breaker, is mounted within a tank 2 and immersed in an insulating liquid 3. The tank has a cover 4 which is suitably secured to a flange 5 at the upper opening of the tank. The cover is provided with a plurality of upwardly-projecting tube sections 7 for mounting leading in bushings 8 through which connection is made to the electrical apparatus 1 within the tank. The bushings 8 are secured to the tube section 7 by means of flanges 9 cooperating with corresponding flanges 10 at the upper end of said tube sections. The cover 4 has also a manhole 11 which is closed by manhole cover 12 placed over the manhole and arranged to be suitably fastened thereon.

The tank 2 is provided with an oil-expansion vessel 15 communicating therewith through a pipe 16 to permit variations of the oil volume incident to the changes of the operating temperature thereof.

As shown in the drawing, the cover is flat and intentionally arranged on the slope so that the gas bubbles developed within the oil will tend to collect on the right hand side of the tank. The bubbles accumulated at that point are lead away therefrom by means of a main 20 and a pipe 21 which terminates in the pipe 16 leading to the expansion chamber 15. The pipes 20, 21 and the connecting pipe 16 are arranged with a continuous rise from right to left so as to exclude the possibility of gas bubbles being trapped at some elbow or corner of said pipe connection.

According to the invention, not only the highest points of the cover are provided with gas-collecting pipes, but a number of additional gas-collecting pipes, 22, 23 and 24 are provided leading to the gas-collecting main 20 from the ridge formed between the flanges of the bushing mounting, from the pocket beneath the manhole cover and from other high points where there is a likelihood of bubbles being trapped. Thus, for instance, a collecting pipe is provided at the middle of the cover which may bulge under the forces of the expansion; another gas-collecting pipe is provided near another point where the cover plate 4 joins the flange 5 of the tank.

The gas bubbles that are thus collected in the collecting main 20 are arranged to be detected by a gas-detecting device 31 disposed at a point in the connecting pipe 16 leading from the transformer tank 2 to the expansion chamber 15. Instead of providing a single gas-detecting device, the individual branch pipes 21 to 25 may be provided with separate gas detectors.

The present invention is also distinguished by the provision of a novel gas-detecting device indicated diagrammatically in the drawing.

According to the invention, the presence of gas bubbles is ascertained by utilizing the respective difference in the heat conductivities of a liquid and a gas for actuating a suitable detecting device or relay. This is based on the fact that gas is a relatively poor heat conductor compared with a liquid. In the present instance, the difference in the heat conductivity of the body of oil and of the gas bubbles generated by the apparatus under the oil are compared with each other; giving an additional advantage in that the body of oil is relatively large, permitting quick removal and conduction away of the heat, while the gas bubbles generated by an arc or spark under the oil is relatively small, thus limiting the amount of heat that can be conducted away from a given heat source. Accordingly, the heat will be readily removed and conducted away by the automatic or artificially induced circulation of the liquid while a relatively negligible heat flow will take place from a heat source located within the gas bubbles.

In the arrangement of Fig. 1 there is shown one form of the invention for utilizing the difference in the respective heat conductivities of the gas and liquid, to actuate a suitable instrument or protective relay. Disposed within the space through which the gas passes, or within which the gas collects, is a resistor element or wire 32. This resistor wire is chosen so as to have a high temperature coefficient, and a resistance responsive device or ohmmeter apparatus 33 is provided for measuring the variations of the electrical resistance of said element. To this end, current is sent through the resistor wire 32 from an electrical supply source such as the transformer 34, the ohmmeter 33 being provided with two operating, relatively movable, elements in the form of coils 36 and 37 actuated by the current flowing through the resistor element, and the voltage across said element, respectively. Accordingly, the relative position of the two coils 36 and 37 of the ohmmeter will give a direct indication of the resistance of the wire 32.

Under normal operating conditions the resistance wire 32 is immersed in oil having a nearly constant temperature, so that the amount of heat transferred at the point by conduction and convection is not subject to large fluctuations. Accordingly, under normal conditions, the temperature of the heating element will remain practically constant, producing a definite indication of the resistance of said wire by the ohmmeter 33. However, if a gas bubble reaches the place surrounding the wire and displaces the oil in said place, the temperature of the wire will momentarily rise in proportion as the rate of heat radiation from the wire has been reduced on account of the lower heat conductivity of the gas bubble. The electrical resistance of the wire 32 will consequently undergo a change which will be reflected in the indication of the ohmmeter 33 or the relative positions of the two coils 36 and 37 thereof.

The ohmmeter 33 is intended to represent diagrammatically the various types of apparatus that may be utilized for detecting and ascertaining the variations of the resistance in the resistance wire 32, such as recording or contact-making instruments, relays and the like. The ohmmeter device 33 may also be utilized for actuating a circuit breaker 40 whereby the apparatus 1 may be cut off from the power line in case of development of a dangerous condition in the apparatus as manifested by the generation of gas bubbles. To this end, the moving element of the ohmmeter is arranged to close a pair of contact members 41, thereby establishing an actuating circuit for opening the circuit if the resistance of the wire 32 reaches a predetermined value corresponding to a resistance increase resulting from the development of gas bubbles within the tank.

In Fig. 2, there is shown a modification utilizing a bridge arrangement for ascertaining the development of gases in the tank 1. To this end, two resistor elements 45 and 46 are mounted within the space in the pipe connection 16 through which the gas bubbles must pass, said resistor elements constituting two opposite arms of a Wheatstone bridge in conjunction with two additional resistor elements 47 and 48. The bridge is supplied at one set of opposite corner terminals with alternating current tapped off from the terminals of an auxiliary resistor 49 which is traversed with current derived from an alternating current transformer 34. The two coil instrument 33 has one coil connected in series with the auxiliary resistor 49 and thus is traversed by the current from the transformer 34, the other coil being connected to the other set of opposite terminals of the bridge. The several resistor elements are so dimensioned that if the two bridge arms 45 and 46 of the electrically heated bridge are immersed in oil no current can flow through the instrument 33. However, if the bridge arms 45 and 46 are surrounded by gas, the resistance increases, destroying the equilibrium of the bridge and actuating the instrument 33 to trip the circuit breaker mechanism 50.

In general, many other modifications will suggest themselves to those skilled in the art for utilizing the phenomena of the variation of heat conductivity of a body for the detection of the presence of gas bubbles in connection with electrical apparatus immersed in oil of the type described above, such as devices utilizing the elongation of a heated wire, the bending of a bi-metallic strip, the melting of a fuse plug or the blowing of a fuse. It is accordingly desired that the appended claims be given a broad construction commensurate with the scope of the invention within the art.

We claim:

1. In combination, an electrical apparatus, an inclosing vessel therefor, a body of insulating liquid surrounding said apparatus within said vessel, means for collecting gas from the highest point in said vessel, and pipe connections from other points on said vessel for leading away the gas formed within said liquid and tending to be trapped at said points, and means for detecting the presence of gas lead away from all points in said vessel.

2. In combination, an inclosed tank, an insulating liquid filling said tank, an electrical apparatus immersed in said liquid, means for ascertaining a defective condition of said apparatus comprising a plurality of pipe connections leading from a plurality of different points in said tank tending to trap gas bubbles ascending from said liquid, a common main for collecting said gas bubbles, said main and said pipe connections being normally filled with oil, and means for detecting the presence of gas in said main, said pipe connections and said main being so arranged that all of the gas bubbles ascending through any of said pipe connections will pass by said gas detecting means.

3. In combination, an inclosing tank, an insulating liquid in said tank, an electrical apparatus immersed within said liquid, and means responsive to the difference in the heat conductivity of said liquid and of gas bubbles generated by said apparatus within said liquid for ascertaining the generation of said bubbles to protect said apparatus.

4. The combination of an inclosing tank, an insulating liquid filling said tank, an electrical apparatus immersed in said liquid, means for collecting gas generated by said apparatus under said liquid, said means providing uninterrupted flow of said gases from said tank, and means for detecting the presence of said gas in said gas-collecting means, said gas-detecting means comprising means responsive to variations of the heat conductivity in the space within said gas-collecting means, said gas-detecting means comprising a resistor element located within said gas-collecting space, and means for ascertaining the variations of the electrical resistance of said element.

5. In an apparatus of the character described, a tank, means providing a fluid connection with said tank, an insulating liquid filling said tank and said connection means, and means operable in response to predetermined conditions of gas-formation in the liquid in said tank, said second-named means including an operating element disposed in said connection means and responsive to differences between the respective heat-conductivities of said liquid and said gas, said connection means providing normally for substantial emersion of said element in said liquid and for circulation of said liquid past said element incident to operation of said apparatus, said connection means providing for gas-displacement of said liquid from substantial effective association with said element incident to gas-formation in said liquid.

In testimony whereof we have hereunto subscribed our names this 28th day of June, A. D. 1927, at Paris.

JAKOB KOPELIOWITSCH.
JOHANNES KUBLER.